United States Patent [19]

Tunick et al.

[11] 4,166,842
[45] Sep. 4, 1979

[54] HYDROXYLAMINE PURIFICATION VIA LIQUID/LIQUID EXTRACTION

[75] Inventors: Allen A. Tunick, Boonton; Fred W. Koff, Long Valley; Stylianos Sifniades, Madison, all of N.J.

[73] Assignee: Allied Chemical Corporation, Morris Township, Morris County, N.J.

[21] Appl. No.: 846,657

[22] Filed: Oct. 28, 1977

[51] Int. Cl.$^2$ ............................................. C01B 21/20
[52] U.S. Cl. ...................................... 423/387; 423/388
[58] Field of Search ............... 423/387; 210/21, 38 R, 210/39, 40

[56] References Cited

U.S. PATENT DOCUMENTS 3,666,466   5/1972   Cook et al. ............................ 423/24

FOREIGN PATENT DOCUMENTS 2206270   6/1974   France ...................................... 423/387

OTHER PUBLICATIONS

Marcus et al., Ion Exchange and Solvent Extration of Metal Complexes, 1970, pp. 236-242.

*Primary Examiner*—O. R. Vertiz
*Assistant Examiner*—Thomas W. Roy
*Attorney, Agent, or Firm*—Horst M. Kasper; Robert A. Harman

[57] ABSTRACT

A process for obtaining hydroxylammonium salts from aqueous solutions containing hydroxylammonium salts in mixture with ammonium and/or sodium salts. Said solutions are contacted with a water immiscible organic solution containing a cation exchange compound of structure $R_1COOX$, or $(R_2O)(R_3O)POOX$, or $(R_2O)PO(OX)_2$, or mixtures thereof and optionally an additive of structure $R_4R_5R_6PO$, or $(R_4O)(R_5O)(R_6O)PO$, or mixtures thereof, wherein $R_1$ is an alkyl or alkenyl group of from twelve to twenty carbon atoms, $R_2$ and $R_3$ are alkyl groups of from six to eighteen carbon atoms, $R_4$, $R_5$ and $R_6$ are alkyl groups of from three to twelve carbon atoms, and X is H, Na or $NH_4$, whereby hydroxylammonium ions are preferentially extracted from the aqueous phase in exchange for X from the organic phase. Said organic solution is subsequently contacted with an aqeuous solution of a strong acid, whereby hydroxylammonium ions are extracted into the aqueous phase. Hydroxylammonium salts are obtained by crystallization from said aqueous phase.

16 Claims, No Drawings

HYDROXYLAMINE PURIFICATION VIA LIQUID/LIQUID EXTRACTION

FIELD OF THE INVENTION

This invention relates to a process of separating hydroxylamine from accompanying impurities in an aqueous system by liquid-liquid extraction.

BACKGROUND OF THE INVENTION

Hydroxylamine is prepared commercially by the Raschig process or variations thereof in which ammonium or sodium nitrite are reacted in aqueous solution with ammonium or sodium bi-sulfite and sulfur dioxide and the resulting disulfonate salts are subsequently hydrolyzed to a solution containing essentially hydroxylammonium sulfate, sulfuric acid, and ammonium sulfate or sodium sulfate plus minor amounts of the corresponding nitrates. This solution can be used, after neutralization with ammonia, as a source of hydroxylamine, e.g. for the synthesis of oximes from ketones. However, there is no simple method for isolating pure hydroxylamine or pure hydroxylammonium salts from the mixture.

One method for obtaining pure hydroxylammonium salts consists of utilizing the hydroxylammonium containing mixture to synthesize an oxime from a ketone, separating the oxime from the spent solution and hydrolyzing this oxime with a strong mineral acid to recover hydroxylammonium salt and the ketone which can be recycled. This method uses long periods of heating for the hydrolysis and requires expensive equipment for the separation of the oxime from the spent solution and of the hydroxylammonium salt from the ketone. Moreover, salts of hydroxylamine with weak or oxidizing acids cannot be prepared by this method because these acids either do not effect hydrolysis of oximes or decompose the hydroxylammonium salt formed during hydrolysis. Salts of such acids can be prepared by neutralizing cold solutions of hydroxylamine with the corresponding acid.

Heinz Holzapfel in Z. Anorg. und Allgem. Chemie, Vol. 288, page 28 (1956) describes the preparation of hydroxylamine from hydroxylammonium salts by employing an anion exchange resin in the OH form. This publication does not relate to the separation of hydroxylamine from solutions containing other cations. As disclosed in U.S. Pat. No. 3,508,864 issued Apr. 28, 1970 to Wallace T. Thompson et al., hydroxylammonium perchlorate can be produced either by liberating hydroxylamine from a hydroxylammonium salt by passage through an anion exchange resin and neutralizing with perchloric acid, or by absorbing hydroxylammonium ion on a cation exchange resin and then passing perchloric acid through the resin. This method does not separate hydroxylamine from other cations. A cation exchange method is described by Earl J. Wheelwright in Industrial Engineering Chemistry Process Design Development, Vol. 16 No. 2 (1977), page 220 for the preparation of hydroxylammonium nitrate. This method does not separate hydroxylamine from other cations and moreover the resulting solution of hydroxylammonium nitrate contains significant amounts of nitric acid.

While the prior art describes methods for the preparation of hydroxylamine and hydroxylammonium salts, there is a need for a simple and inexpensive process for separating hydroxylamine from solutions containing salts of other cations.

SUMMARY OF THE INVENTION

We have found that hydroxylammonium ions are preferentially extracted when an aqueous solution containing hydroxylammonium salts is contacted with a water immiscible organic solution containing a cation exchange compound of structure $R_1COOX$, or $(R_2O)(R_3O)POOX$, or $(R_2O)PO(OX)_2$, or mixtures thereof and optionally an additive of structure $R_4R_5R_6PO$, or $(R_4O)(R_5O)(R_6O)PO$, or mixtures thereof, wherein $R_1$ is an alkyl or alkenyl group of from twelve to twenty carbon atoms, $R_2$ and $R_3$ are alkyl groups of from six to eighteen carbon atoms, $R_4$, $R_5$ and $R_6$ are alkyl groups of from three to twelve carbon atoms, and X is H, Na or $NH_4$. When said organic solution is subsequently contacted with an aqueous solution of a strong acid, hydroxylammonium salts of said acid are formed and can be recovered by crystallization.

In a narrower embodiment of the invention, aqueous solutions of hydroxylammonium sulfate and ammonium sulfate are extracted countercurrently with kerosene solutions of ammonium di(2-ethylhexyl)phosphate and trioctyl-phosphine oxide. Said kerosene solution is subsequently extracted with an aqueous solution of sulfuric acid. Hydroxylammonium sulfate is recovered by crystallization from the second aqueous solution.

DETAILED DESCRIPTION OF THE INVENTION

The present invention provides for the isolation of hydroxylammonium salts from aqueous solutions containing hydroxyl ammonium salts in mixture with salts of ammonium or sodium ion. In a narrower embodiment the present invention provides for the isolation of hydroxylammonium sulfate from mixtures with ammonium sulfate which are easily obtained by neutralization of commercial feedstock produced in the Raschig synthesis of hydroxylamine.

The principle on which the process of the present invention is based is that of liquid-liquid cation exchange. It is known that cations can be extracted from aqueous solution into a water immiscible organic phase containing compounds, such as acids or salts, which can yield exchange cations.

We have found that water immiscible organic solutions of certain carboxylic acids and of certain acid phosphate esters extract hydroxylammonium ions in preference to sodium or ammonium ions when contacted with aqueous solutions containing said ions in mixture with the corresponding free bases. The extraction medium can comprise an organic liquid having dissolved an ionizable but otherwise hydrophobic molecule. We have also found that the extraction may proceed from essentially neutral aqueous solutions of hydroxylammonium, ammonium and/or sodium salts if organic solutions of ammonium and/or sodium salts of said carboxylic acids and acid phosphate esters are used as extractants. This mode of operation is the preferred one and is depicted by the following equilibrium.

$$(RX)_{org} + (NH_3OH^+)_{aq} \rightleftharpoons (RNH_3OH)_{org} + (X^+)_{aq} \qquad (1)$$

In reaction (1), R represents the carboxylic acid anion or the acid phosphate ester anion and X is sodium or ammonium. Associated with the extraction process of reaction (1) is a biphasial equilibrium constant, K, relating the concentration of the species in the organic phase to the concentration of the species in the aqueous phase.

$$K = [RNH_3OH]_{org}[X^+]_{aq}/[RX]_{org}[NH_3OH^+]_{aq} \quad (2)$$

The higher the constant K, the more selective is the extraction of hydroxylammonium ion from the aqueous into the organic phase. If K=1, the ratio of hydroxylammonium to $X^+$ is the same in both the organic and aqueous phases and no enrichment by extraction is possible.

The carboxylic acids and their salts that effect preferential extraction of hydroxylammonium ion from aqueous solutions have structure $R_1COOX$, wherein $R_1$ is an alkyl or alkenyl group of from twelve to twenty carbon atoms and X is proton, sodium or ammonium and include for example lauric acid, oleic acid, palmitic acid, stearic acid and the corresponding sodium and ammonium salts.

The acid phosphate esters and their salts that effect preferential extraction of hydroxylammonium ion from aqueous solutions are of the structure $(R_2O)(R_3O)POOX$ or $(R_2O)PO(OX)_2$ wherein $R_2$ and $R_3$ are alkyl groups containing from six to eighteen carbon atoms. Particularly useful is the acid ester di-2-ethylhexylphosphoric acid, abbreviated as D2EHPA. The equilibrium constant, K, for extraction of hydroxylammonium ions by kerosene solutions of the ammonium salt of D2EPA is about three.

The selectivity of the extraction is further enhanced if certain additives are present in the organic phase. Said additives do not by themselves extract hydroxylammonium ion but they apparently stabilize the hydroxylammonium salt of the acid phosphate esters in the organic phase, probably by means of hydrogen bonding interactions. The additives are phosphine oxides of structure $R_4R_5R_6PO$, or phosphate esters of structure $(R_4O)(R_5O)(R_6O)PO$ wherein $R_4$, $R_5$ and $R_6$ are alkyl groups containing from three to twelve carbon atoms. For example, when a kerosene solution containing D2EHPA ammonium salt in mixture with trioctylphosphine oxide is used to extract hydroxylammonium ions from aqueous solution, the equilibrium constant, K, is about eight.

The selectivity for extraction of hydroxylammonium ion from mixtures with sodium ion is generally much higher than the selectivity for extraction of hydroxylammonium ion from mixtures with ammonium ion. For example, the equilibrium constant, K, for extraction of hydroxylammonium ion from mixtures with sodium ion using a kerosene solution of D2EHPA and trioctylphosphine oxide is greater than 100.

In addition to the nature of the acid phosphate ester and of the additive, the pH, temperature, composition of the aqueous phase and the composition of the organic phase influence the success of the extraction.

With respect to pH, the aqueous solution to be extracted should contain either neutral salts or a mixture of neutral salts and free bases. In the presence of strong acids the extraction of hydroxylammonium ion is hindered because the acid phosphate esters have high affinity for protons and exist largely as free acids under these circumstances.

On the other hand, strongly basic solutions are not suitable for extraction because under these conditions hydroxylammonium ion is completely converted to hydroxylamine and cannot be extracted. Moreover, under strongly basic conditions the extractant, RX, dissolves to a significant extent in the aqueous phase.

The pH of the aqueous phase after equilibration with the organic phase should be between about five and eight and preferably between about six and 7.5. The hydroxylammonium sulfate solutions obtained commercially by the Raschig synthesis of hydroxylamine contain significant amounts of free acid and must be, therefore, neutralized prior to extraction by the process of the present invention. Neutralization may be effected either by the addition of base, preferably ammonia, or by treatment with an anion exchange resin in the base form, which removes the free acid. The aqueous solution containing hydroxylamine salts can be mixed with a monovalent amine or hydroxide base in an amount sufficient to convert a substantial portion of hydroxylammonium ions to hydroxylamine.

The extraction temperature is not critical for the extraction provided that it is maintained between the freezing point and the boiling point of the aqueous and organic phases. For economic reasons it is desirable to operate between 10° C. and 60° C. and preferably between 20° C. and 40° C.

With respect to the compositions of the aqueous phase, the absolute concentration of hydroxylammonium ion is not critical and solutions containing as little as $10^{-3}$ M of said ion can be extracted. For economic reasons, concentration over 1 M is preferred. More pertinent is the mole fraction of hydroxylammonium ion in so far that if sodium and/or ammonium ions are present in large excess the process may not be economically attractive. Mole fractions of hydroxylammonium ion higher than 0.10 and preferably higher than 0.20 are desired. The mole fraction of hydroxylammonium ion in Raschig process solutions neutralized by addition of ammonia is about 0.25. If the neutralization is effected by means of an anion exchange resin, said mole fraction is about 0.35.

The solvent forming the organic phase used to dissolve the cation exchange compounds and additives of the present invention must be substantially immiscible with water and inert to all components of both the aqueous and organic phase. Such solvents are for example the paraffinic and aromatic hydrocarbons and halocarbons. From the economic point of view kerosenes of various grades are preferred and especially the kerosenes of metallurgical grade which have high flash point. The concentration of the cation exchange compound may range from 0.1 M to 2.5 M. Lower concentrations are not economical because the large volumes of the organic phase involved necessitate excessive expenditure of energy for pumping and require large storage facilities. Higher concentrations result in increased viscosity and create emulsification problems. The more preferred concentration range is from 0.4 to 1.0 M. The molar ratio of the additive to the acid phosphate ester may range from zero to about one and preferably from 0.2 to 0.8. Preferably the cations present in the organic phase are essentially the same as in the aqueous solution containing hydroxylammonium salts.

Extraction of hydroxylammonium ion from the aqueous phase into the organic phase results in enrichment of hydroxylammonium ions in said organic phase, but usually no complete separation is achieved in a single stage extraction especially if the aqueous phase contains ammonium ions. It is known in the art, however, that if a certain component can be preferentially extracted in a single stage, complete separation of said component is possible if multi-stage extraction is employed. We have found that multi-stage countercurrent extraction is applicable to the process of the present invention and that complete extraction of hydroxylammonium ions into the organic phase is possible in this manner. We have furthermore found that by employing reflux stages it is possible to obtain organic phases containing hydroxylammonium ions free of other cations. An organic phase results containing essentially pure hydroxylamine. By reflux it is meant that an organic phase containing hydroxylammonium ions in mixture with other cations is contacted with an aqueous solution containing essentially pure hydroxylammonium salts which is obtained at a later stage of the process. If this contact is conducted in countercurrent fashion, all other cations are transferred into the aqueous phase in exchange for hydroxylammonium ions. The use of reflux stages is particularly pertinent in the case of extraction of hydroxylammonium ions from mixtures with ammonium ions because the equilibrium constant, K, is relatively small in that case.

Hydroxylammonium ions are recovered from an organic phase by stripping with an aqueous solution of a strong acid. During stripping the following reaction takes place:

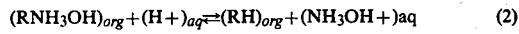

$$(RNH_3OH)_{org} + (H^+)_{aq} \rightleftharpoons (RH)_{org} + (NH_3OH^+)_{aq} \quad (2)$$

This reaction goes essentially to completion if a slight excess of the acid over hydroxylammonium ion is used. The nature of the acid is not critical as long as it is a strong water soluble acid and does not cause side reactions under the stripping conditions. Suitable acids are for example hydrochloric, hydrobromic, nitric, perchloric, phosphoric, polyphosphoric, sulfuric, and sulfonic acids such as methanesulfonic and p-toluenesulfonic. The concentration of the acid is not important, but for economic reasons concentrations over 0.2 M are used. Concentrations from 1 M to 6 M are preferred. Optionally the stripping acid solution may also contain the corresponding hydroxylammonium salt. The temperature of the stripping is generally maintained above the temperature at which crystallization of hydroxylammonium salt would take place and below the boiling point of either the organic or aqueous phase. The preferred temperature range is between 10° C. and 50° C. After stripping, hydroxylammonium salts may be obtained from the aqueous phase by means of evaporation, cooling and other techniques known in the art. An alternative method for obtaining pure hydroxylammonium salts is by combining the extraction/stripping sequence of the present invention with a crystallization step. For example, a study of the phase diagram of the system hydroxylammonium sulfate/ammonium sulfate/water reveals that in the solutions obtained by neutralizing technical Raschig process streams by contact with a tertiary amine ion exchange resin the first solid phase to separate upon concentration or cooling is ammonium sulfate. When said solutions are subjected to extraction with an organic extractant phase and said phase is subsequently stripped with sulfuric acid according to the process of the present invention, the resulting aqueous phase is highly enriched in hydroxylammonium sulfate relative to ammonium sulfate and partial crystallization yields pure hydroxylammonium sulfate. The mother liquors from the crystallization may be recycled to a subsequent extraction/stripping cycle for complete recovery of the hydroxylammonium sulfate.

After stripping, the organic phase may be used directly for a new extraction or it may be first treated with ammonia or sodium hydroxide in order to convert the acid phosphate ester to an ammonium or sodium salt.

The following examples are given for illustrative purposes and are not to be construed as limiting the scope of the invention.

EXAMPLE 1

Fifteen milliliters of an aqueous solution containing 6.29 lg (95.22 meq) ammonium sulfate, 2.593 g (31.60 meq) hydroxylammonium sulfate and 0.953 g (15.67 meq) concentrated (28% by weight) aqueous ammonia (pH=7.01) was shaken at 25° C. with 25.0 ml of a kerosene solution of 4.030 g (12.50 meq) di-2-ethylhexyl)-phosphoric acid (D2EHPA). The kerosene layer was separated and shaken with 10.0 ml of 1 M aqueous sulfuric acid to remove all extracted hydroxylamine and ammonia. Potentiometric titration of a 1.00 ml portion of the resulting aqueous acid layer with standard NaOH indicated that the original extraction had removed 6.60 meq hydroxylamine and 7.39 meq ammonia. The selectivity for hydroxylamine over ammonia was thus 3.70.

EXAMPLE 2

A 5.0 ml portion of an aqueous solution identical to that used in example 1 was shaken at 25° C. with 10.0 ml of a kerosene solution of 1.612 g (5.00 meq) D2EHPA and 0.967 g (2.50 meq) trioctylphosphine oxide (TOPO). The kerosene layer was separated and a 5.0 ml portion was shaken with 5.0 ml 1 M aqueous sulfuric acid. Potentiometric titration of a 1.0 ml portion of the resulting aqueous acid layer with standard NaOH indicated that 2.72 meq hydroxylamine and 2.23 meq of ammonia had been removed by the original extraction. The selectivity for hydroxylamine over ammonia was thus 5.42.

EXAMPLE 3

A 5.00 ml portion of an aqueous solution containing 0.687 g (8.38 meq) hydroxylammonium sulfate, 0.886 g (13.40 meq) ammonium sulfate, 0.509 g (8.38 meq) 28% aqueous ammonia, and sufficient 96% sulfuric acid to bring the pH to 6.99 was shaken with 9.73 ml of a kerosene solution of 2.004 g (6.22 meq) D2EHPA and 1.452 g (3.76 meq) TOPO at 34° C. The kerosene layer was separated and a 5.00 ml portion was shaken with 5.00 ml 1 M sulfuric acid. Analysis of the aqueous acid layer as in the previous examples indicated that the original extraction had removed 3.206 meq of hydroxylamine and 1.290 meq of ammonia. The selectivity for hydroxylamine over ammonia was thus 9.84.

EXAMPLE 4

A 5.00 ml portion of an aqueous solution identical to that used in example 1 was shaken at 25° C. with 20.0 ml of a kerosene solution of 2.825 g (10.0 meq) oleic acid. The kerosene layer was separated and a 10.0 ml portion was shaken with 5.00 ml 1 M sulfuric acid. Analysis of the aqueous acid layer as in the previous examples indicated that the original extraction had removed 1.200 meq hydroxylamine and 1.824 meq ammonia. The selectivity for hydroxylamine over ammonia was thus 2.48.

EXAMPLE 5

A 5.00 ml portion of an aqueous solution prepared by adding (with external cooling) 2.00 ml 28% ammonia to 10.00 ml of a solution containing 4.72 N ammonium sulfate, 1.78 N hydroxylammonium sulfate, and 1.936 N sulfuric acid was shaken with 10.0 ml of a kerosene solution of 1.33 g octylphenyl acid phosphate (OPAP) (Mobil Chemical Co.). The OPAP had been previously analyzed and shown to contain essentially equimolar amounts of the mono- and di-esters, and the solution thus contained 1.75 mmol of each compound. The kerosene layer was separated, and a 5.00 ml portion was shaken with 5.00 ml 1 M sulfuric acid. Analysis of the aqueous layer as in the previous examples indicated that the original extraction had removed 1.756 meq hydroxylamine and 3.52 meq of ammonia. The selectivity for hydroxylamine over ammonia was thus 2.49.

EXAMPLE 6

A 5.00 ml portion of an aqueous solution identical to that used in example 5 was shaken with 10.0 ml of a kerosene solution of 1.61 g (5.00 meq) D2EHPA and 1.332 g (5.00 meq) of tributyl phosphate. The kerosene layer was separated and a 5.00 ml portion was shaken with 5.00 ml of 1 M sulfuric acid. Analysis of the aqueous acid layer as in the previous examples indicated that the original extraction had removed 2.184 meq of hydroxylamine and 2.672 meq of ammonia. The selectivity for hydroxylamine over ammonia was thus 4.54.

EXAMPLE 7

Hydroxylamine Solution with Sodium Salts

A 5.0 ml aqueous solution containing 0.880 g (10.73 meq) hydroxylamine hydrochloride, 1.085 g (18.56 meq) sodium chloride, and 0.188 g (4.69 meq) sodium hydroxide was shaken with 10.0 ml of a kerosene solution containing 1.612 g (5.00 meq) D2EHPA and 0.967 g (2.50 meq) TOPO. A 5.00 ml. portion of the kerosene layer was then shaken with 5.00 ml of 2.025 N $H_2SO_4$. Analysis of the resulting aqueous acid layer indicated that the original extraction had removed 4.14 mequiv of hydroxylamine and that only traces of sodium and chloride ions had been transferred.

EXAMPLE 8

Countercurrent Extraction

An extraction apparatus consisted of a vertical glass tube, of 1.2 cm internal diameter, 130 cm long, closed at the bottom and open at the top and equipped with four ports, A, B, C, D, located correspondingly at 5 cm, 10 cm, 116 cm and 124 cm from the bottom. A glass rod, 0.5 cm diameter and 140 cm long was positioned on the long axis of the tube and was supported by means of a polytetrafluoroethylene bearing at the bottom and a greased glass bearing at the top. Two pieces of nichrome wire, 0.64 mm thick, 120 cm long, were attached along the length of the rod on opposite sides thereof by means of ten equally spaced loops of nichrome wire of the same thickness. The rod/wire assembly could be spun by means of a variable speed motor attached at the top of the rod. The total capacity of the apparatus up to port D was 130 ml.

In order to start an extraction, 115 ml of kerosene was placed in the apparatus, then 15 ml of a kerosene solution 0.75 molar in D2EHPA and 0.5 M in TOPO previously saturated with anhydrous ammonia at atmospheric pressure and essentially ambient temperature were introduced through port B. The rod/wire assembly was started spinning at about 360 rpm while said kerosene solution of D2EHPA/TOPO was introduced through port B at the rate of 2 to 3 ml/min and an aqueous solution, which was made by dissolving 4.45 equivalents of ammonium sulfate, 1.19 equivalents of hydroxylammonium sulfate and 0.29 equivalents of ammonia in sufficient water to obtain total volume equal to one liter, was introduced through port C at the rate of 0.5 to 1 ml/min. Simultaneously, aqueous raffinate was collected through port A and kerosene extract through port D. The operation was continued for 77 min, at which time 210 ml of the kerosene solution and 55 ml of the aqueous solution had been fed to the apparatus. The temperature during extraction was about 25° C. The aqueous raffinate collected contained 184 meq of ammonium ion and 8.5 meq of hydroxylammonium ion. The kerosene extract was stripped with 1 molar sulfuric acid which was titrated and found to contain 41.0 meq of ammonium ion and 37.7 meq of hydroxylammonium ion. Thus the apparent selectivity for hydroxylamine in this extraction is equal to $(184 \times 37.7)/(8.5 \times 41.0) = 19.9$, a far greater value than obtained in single-stage extraction. It is estimated that the apparatus used provided 4–5 theoretical extraction stages. This example demonstrates that countercurrent extraction can be used to extract hydroxylammonium ion almost quantitatively from an aqueous solution containing a mixture of hydroxylammonium and ammonium salts.

EXAMPLE 9

Continuous Recovery of Hydroxylammonium Sulfate (a) Extraction

An aqueous solution 2.65 normal in ammonium sulfate, 1.00 normal in hydroxylammonium sulfate and 1.15 normal in sulfuric acid is neutralized by the addition of anhydrous ammonia in equivalent amount to the sulfuric acid present in solution. The resulting solution is extracted in countercurrent fashion employing six theoretical stages with a kerosene solution 0.75 molar in D2EHPA and 0.50 molar in TOPO previously saturated with ammonia. The aqueous raffinate is essentially depleted of hydroxylamine and is about 4.80 normal in ammonium sulfate. The kerosene extract is about 0.23 normal in ammonia and about 0.37 normal in hydroxylamine.

(b) Reflux

The kerosene extract from (a) is contacted in five countercurrent extraction stages with an aqueous solution about 4.80 normal in hydroxylammonium sulfate. The aqueous raffinate is about 3.80 normal in ammonium sulfate and about 1.00 normal in hydroxylammonium sulfate and is recycled to Extraction (a). The kerosene extract is essentially depleted of ammonia and is about 0.60 normal in hydroxylamine.

(c) Stripping

The kerosene extract from (b) is contacted in two countercurrent extraction stages with an aqueous solution 4.80 normal in sulfuric acid. The aqueous strip solution is about 4.80 normal in hydroxylammonium sulfate, and contains only traces of ammonium sulfate and sulfuric acid. About one-half of this solution is removed from the operation as product stream from which hydroxylammonium sulfate may be crystallized and the remainder is recycled to Reflux (b). The stripped kerosene solution is essentially depleted of hydroxylamine. This solution is saturated with anhydrous ammonia at essentially atmospheric pressure and recycled to Extraction (a).

EXAMPLE 10

Continuous Recovery of Hydroxylammonium Sulfate (a) Extraction

The extraction step is carried out as in Example 9.

(b) Stripping

The kerosene extract from (a) is stripped in two countercurrent extraction stages with an aqueous solution 4.80 normal in sulfuric acid. The aqueous strip solution is about 1.84 normal in ammonium sulfate and about 2.96 normal in hydroxylammonium sulfate. An aqueous solution of sulfuric acid strips substantially all hydroxylammonium ions and ammonium ions from the organic solution. The stripped kerosene solution is saturated with anhydrous ammonia and recycled to Extraction (a).

(c) Crystallization

The aqueous solution from stripping (b) is subjected to fractional crystallization by evaporation and cooling to about 10° C. About 60% of the hydroxylammonium sulfate present in solution is recovered in essentially pure crystalline form. The mother liquor from the crystallization is recycled to Extraction (a).

We claim:

1. A process for selectively extracting hydroxylammonium ions from aqueous solutions containing hydroxylammonium salts in mixture with ammonium salt or ammonium and sodium salts comprising the following steps:

contacting said solutions with an extraction medium comprising an organic solution containing a cation exchange compound of structure $R_1COOX$ or $(R_2O)(R_3O)POOX$ or $(R_2O)(PO)(OX_2)$ or mixtures thereof wherein $R_1$ is an alkyl or alkenyl group from twelve to twenty carbon atoms, $R_2$ and $R_3$ are alkyl groups of from six to eighteen carbon atoms and X is H, Na, or $NH_4$, thereby removing from the solution some or all of the hydroxylammonium ions by selective extraction and wherein the aqueous phase after extraction has a pH of between about five and eight; and contacting the extraction medium with an aqueous acid thereby removing hydroxylammonium ion.

2. The process as set forth in claim 1 wherein the aqueous solutions containing hydroxylammonium salts are in mixture with essentially ammonium sulfate and sulfuric acid.

3. The process as set forth in claim 1 wherein the extraction medium comprises additionally a water immiscible organic solution having added a phosphine oxide or a neutral phosphate ester.

4. The process as set forth in claim 1 wherein the cation exchange compound is a carboxylic acid.

5. The process as set forth in claim 1 wherein the cation exchange compound is an acid phosphate ester.

6. The process as set forth in claim 1 wherein the concentration of the cation exchange compound is between about 0.4 and 1 molar.

7. The process as set forth in claim 1 wherein the hydroxylammonium ion is selectively extracted by a multistage countercurrent extraction.

8. The process as set forth in claim 1 wherein the aqueous solution containing hydroxylammonium salts has been mixed with monovalent amine or hydroxide base in amount sufficient to convert a substantial portion of hydroxylammonium ions to hydroxylamine.

9. The process as set forth in claim 7 wherein the cations originally present in the organic phase are essentially the same as in the aqueous solution containing hydroxylammonium salts.

10. The process as set forth in claim 7 wherein the resulting aqueous phase is substantially depleted of hydroxylammonium ions and the organic phase contains essentially pure hydroxylammonium ions.

11. The process as set forth in claim 1 wherein the solution temperature is between about 10 and 60° C.

12. The process as set forth in claim 11 wherein the solution temperature is between about 20° and 40° C.

13. The process as set forth in claim 1 for selectively extracting hydroxylammonium ion from aqueous solutions wherein an aqueous solution containing a relatively high concentration of hydroxylammonium sulfate, in mixture with ammonium sulfate and, optionally, sodium sulfate and/or sulfuric acid is contacted by a selective organic extracting medium to preferentially extract the hydroxylammonium ion therefrom without appreciable extraction of sodium and ammonium into the organic solution and thereafter the organic and aqueous solutions are separated and the hydroxylammonium values are separated from the organic phase comprising:

(a) providing an organic extraction medium solution comprising a cation exchange compound with a formula of the group consisting of $R_1COOX$, $(R_2O)(R_3O)POOX$, $R_2O(PO)(OX)_2$ and mixtures thereof, and an additive with a formula of the group consisting of $R_4R_5R_6PO$ and $(R_4O)(R_5O)(R_6O)PO$ and mixtures thereof wherein $R_1$ is an alkyl or alkenyl group having between about twelve to twenty carbon atoms, $R_2$ and $R_3$ are alkyl groups having between about six to eighteen carbon atoms, $R_4$, $R_5$, $R_6$ are alkyl groups having between about three and twelve carbon atoms and wherein X is hydrogen, sodium or ammonium;

(b) stripping essentially all of the hydroxylammonium value from said extraction medium after the aqueous solution has been contacted by said extraction medium and the organic and aqueous solutions have been separated; and (c) continuously recycling said extraction solution to extract further hydroxylammonium values without a substantial loss in extraction capacity.

14. The process as set forth in claim 1 for selectively extracting hydroxylammonium ion wherein hydroxylammonium ion is continuously separated from aqueous solutions containing essentially hydroxylammonium sulfate and nitrate, ammonium sulfate and nitrate, and sulfuric acid comprising the following steps:

(a) neutralizing said solutions by addition of ammonia or by contact with an anion exchange resin in the free base form;

(b) contacting said solutions in multistage countercurrent fashion with an extraction medium of a water-immiscible organic solution of di-2-ethylhexyl-phosphoric acid and trioctylphosphine oxide previously saturated with ammonia thereby extracting hydroxylammonium ions from said solution;

(c) contacting the organic solution resulting from step (b) in multistage countercurrent fashion with an aqueous solution of hydroxylammonium sulfate thereby replacing substantially all residual ammonium ions in said organic solution with hydroxylammonium ions and recycling the resulting aqueous solution to step (b);

(d) contacting the organic solution resulting from step (c) in multistage countercurrent fashion with an aqueous solution of sulfuric acid thereby stripping substantially all hydroxylammonium ions from said organic solution and obtaining an aqueous solution of substantially pure hydroxylammonium sulfate;

(e) saturating at essentially atmospheric pressure the organic solution resulting from step (d) with essentially anhydrous ammonia and recycling said solution to step (b); and (f) recycling to step (c) a portion of the aqueous hydroxylammonium sulfate solution obtained in step (d) and recovering crystalline hydroxylammonium sulfate from the balance of said solution.

15. The process as set forth in claim 1 for selectively extracting hydroxylammonium ion wherein hydroxylammonium ion is continuously separated as hydroxylammonium sulfate from aqueous solutions containing essentially hydroxylammonium sulfate and/or nitrate, ammonium sulfate and/or nitrate, sodium sulfate and/or nitrate and/or sulfuric acid comprising the following steps:

(a) neutralizing said solution by addition of ammonia or sodium hydroxide or sodium carbonate or by contact with an anion exchange resin in the free base form;

(b) contacting said solution in multistage countercurrent fashion with an extraction medium of a water-immiscible organic solution of di-2-ethylhexylphosphoric acid and trioctylphosphine oxide previously saturated with ammonia and thereby extracting hydroxylammonium ions from said solution;

(c) contacting the organic solution resulting from step (b) with an aqueous solution of sulfuric acid thereby stripping substantially all hydroxylammonium and ammonium ions from said organic solution and obtaining an aqueous solution of hydroxylammonium sulfate and ammonium sulfate;

(d) separating by fractional crystallization a portion of the hydroxylammonium sulfate from the aqueous solution obtained in step (c) and recycling the resulting mother liquor to step (b); and (e) saturating at essentially atmospheric pressure the organic solution resulting from step (d) with essentially anhydrous ammonia and recycling said solution to step (b).

16. The process as set forth in claim 15 for selectively extracting hydroxylammonium ions from aqueous solutions wherein the extraction medium comprises kerosene.

* * * * *